(12) United States Patent (10) Patent No.: US 11,190,799 B2
Jangwon et al. (45) Date of Patent: Nov. 30, 2021

(54) INTRA-PREDICTION MODE-BASED IMAGE PROCESSING METHOD AND APPARATUS THEREFOR

(71) Applicant: LG ELECTRONICS INC., Seoul (KR)

(72) Inventors: Choi Jangwon, Seoul (KR); Lim Jaehyun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 156 days.

(21) Appl. No.: 16/626,002

(22) PCT Filed: Mar. 30, 2018

(86) PCT No.: PCT/KR2018/003781
§ 371 (c)(1),
(2) Date: Dec. 23, 2019

(87) PCT Pub. No.: WO2018/236031
PCT Pub. Date: Dec. 27, 2018

(65) Prior Publication Data
US 2020/0128272 A1 Apr. 23, 2020

Related U.S. Application Data

(60) Provisional application No. 62/575,511, filed on Oct. 22, 2017, provisional application No. 62/522,710, filed on Jun. 21, 2017.

(51) Int. Cl.
*H04N 19/593* (2014.01)
*H04N 19/176* (2014.01)
(Continued)

(52) U.S. Cl.
CPC ......... *H04N 19/593* (2014.11); *H04N 19/176* (2014.11); *H04N 19/186* (2014.11); *H04N 19/85* (2014.11)

(58) Field of Classification Search
CPC .. H04N 19/593; H04N 19/176; H04N 19/186; H04N 19/85
(Continued)

(56) References Cited

U.S. PATENT DOCUMENTS 9,648,330 B2 * 5/2017 Pu .................. H04N 19/105
2013/0272396 A1 * 10/2013 Liu .................. H04N 19/176
375/240.12
2014/0348240 A1 * 11/2014 Kim .................. H04N 19/186
375/240.16

FOREIGN PATENT DOCUMENTS

KR 20150048637 A 5/2015
KR 20160013890 A 2/2016
(Continued)

*Primary Examiner* — Jae N Noh
(74) *Attorney, Agent, or Firm* — Dentons US LLP

(57) ABSTRACT

Disclosed are an intra-prediction mode-based image processing method and apparatus. In particular, the intra-prediction mode-based image processing method may comprise the steps of: generating a pre-prediction sample of a current chroma block by performing first component prediction in which a reconstructed sample of a luminance block corresponding to the current chroma block is used; determining whether or not second component prediction is applicable to the current chroma block; and when the second component prediction is applicable, generating a final prediction sample of the current chroma block by using the pre-prediction sample and a residual signal of another chroma block corresponding to the current chroma block.

15 Claims, 10 Drawing Sheets luma block    Cb block    Cr block
(701)         (702)       (703)

(51) Int. Cl.
*H04N 19/186* (2014.01)
*H04N 19/85* (2014.01)

(58) Field of Classification Search
USPC .................................................. 375/240.12
See application file for complete search history.

(56) References Cited

FOREIGN PATENT DOCUMENTS

| KR | 20160032124 A | 3/2016 |
| KR | 20160052808 A | 5/2016 |
| KR | 101691314 B1 | 12/2016 |

* cited by examiner

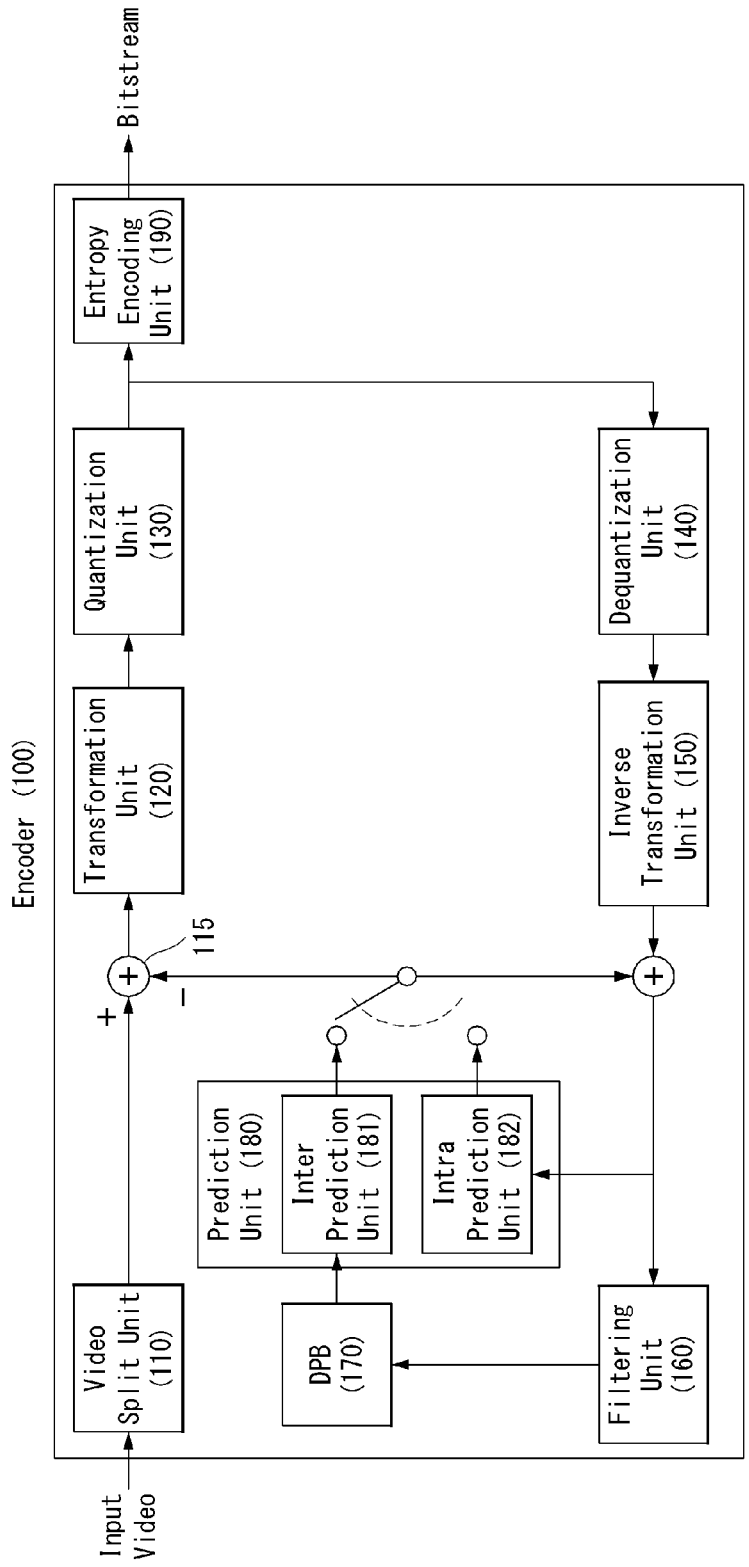
[FIG. 1]

[FIG. 2]
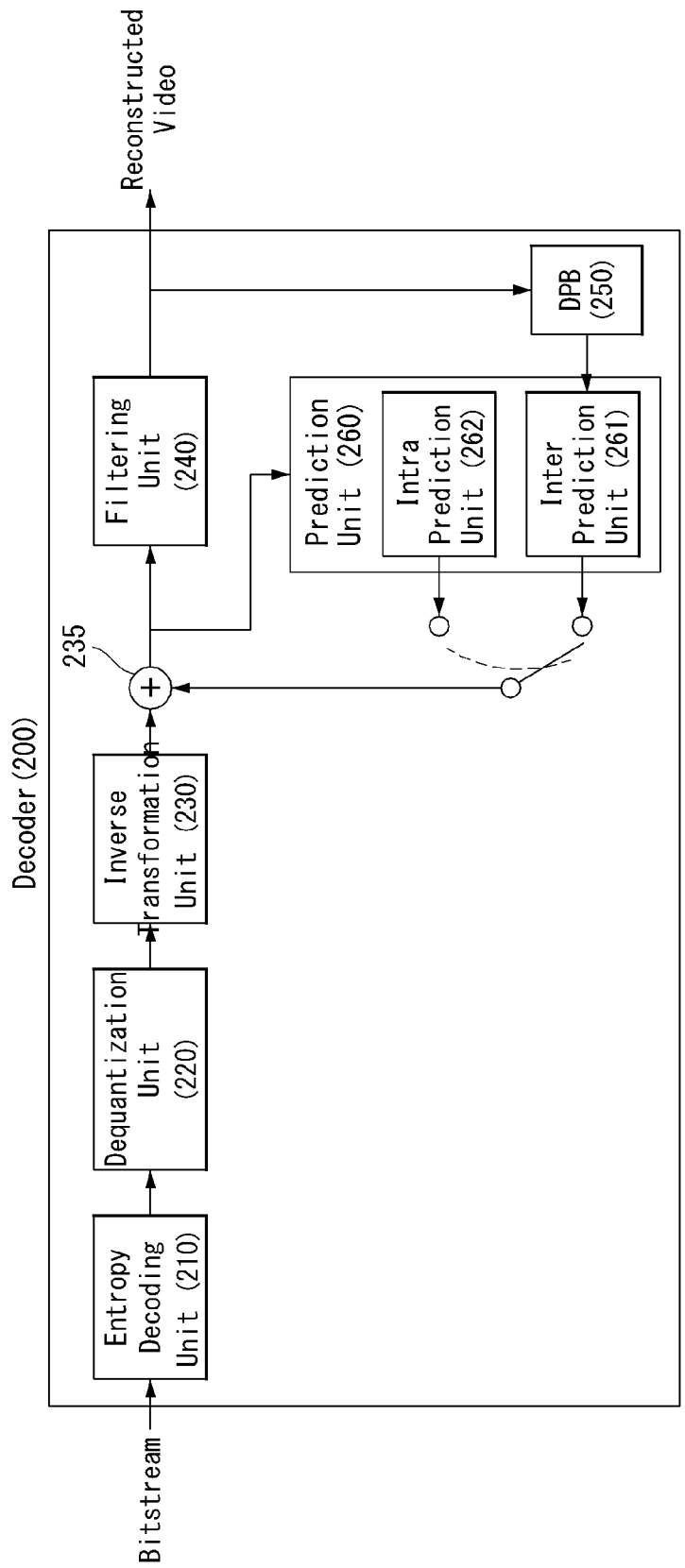

[FIG. 3]
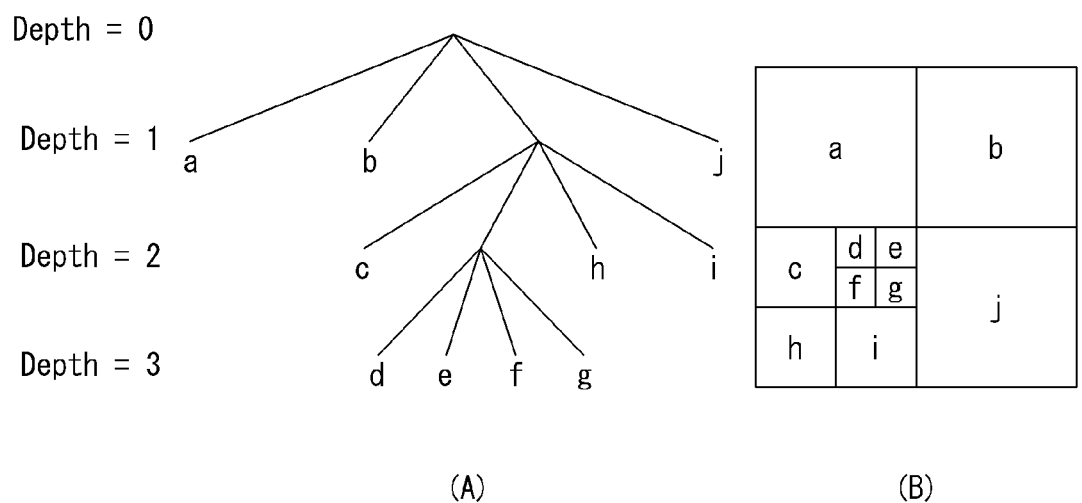

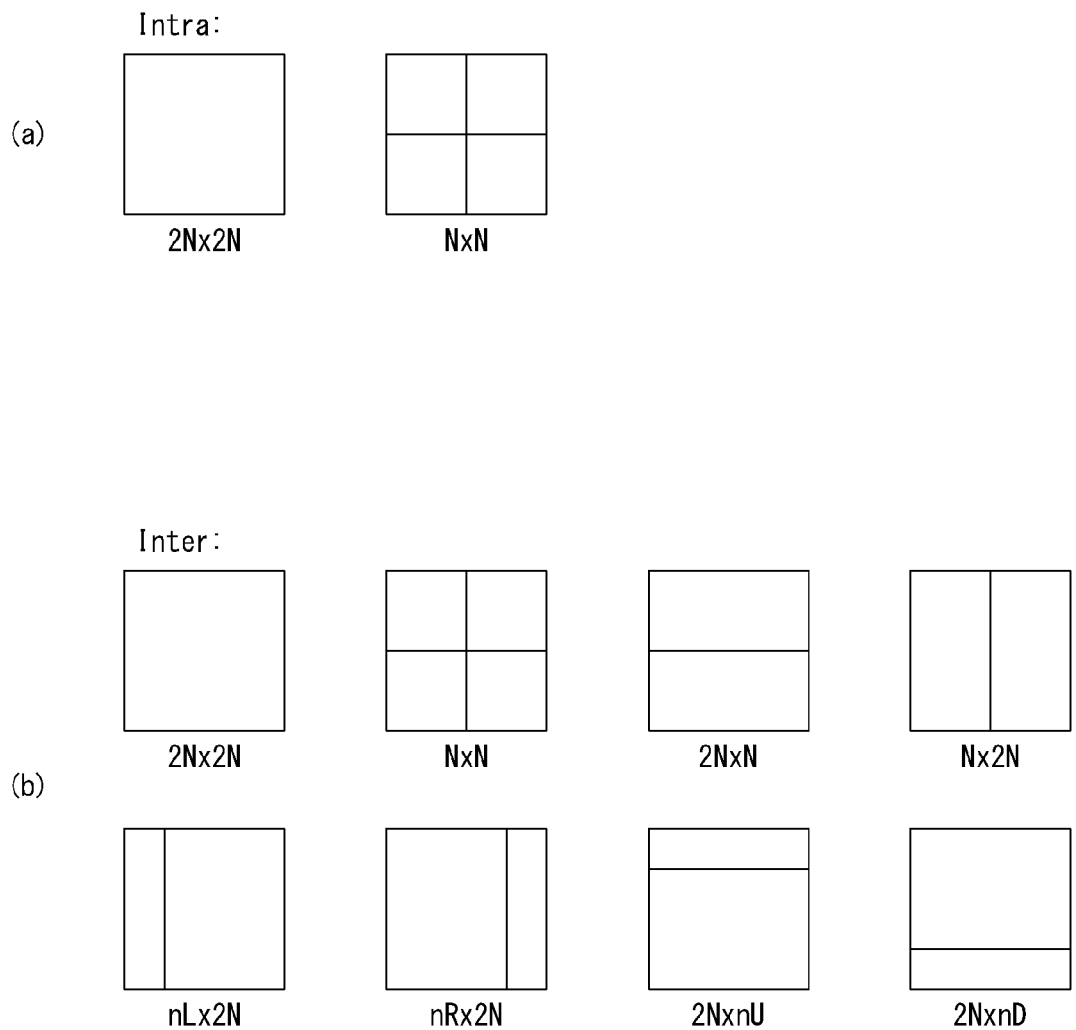
[FIG. 4]

[FIG. 5]
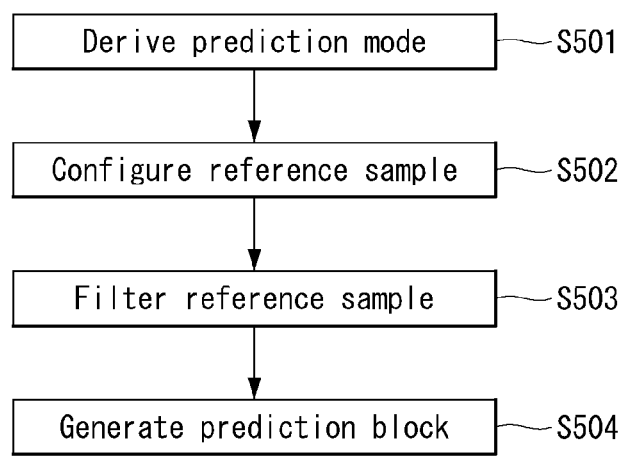

[FIG. 6]
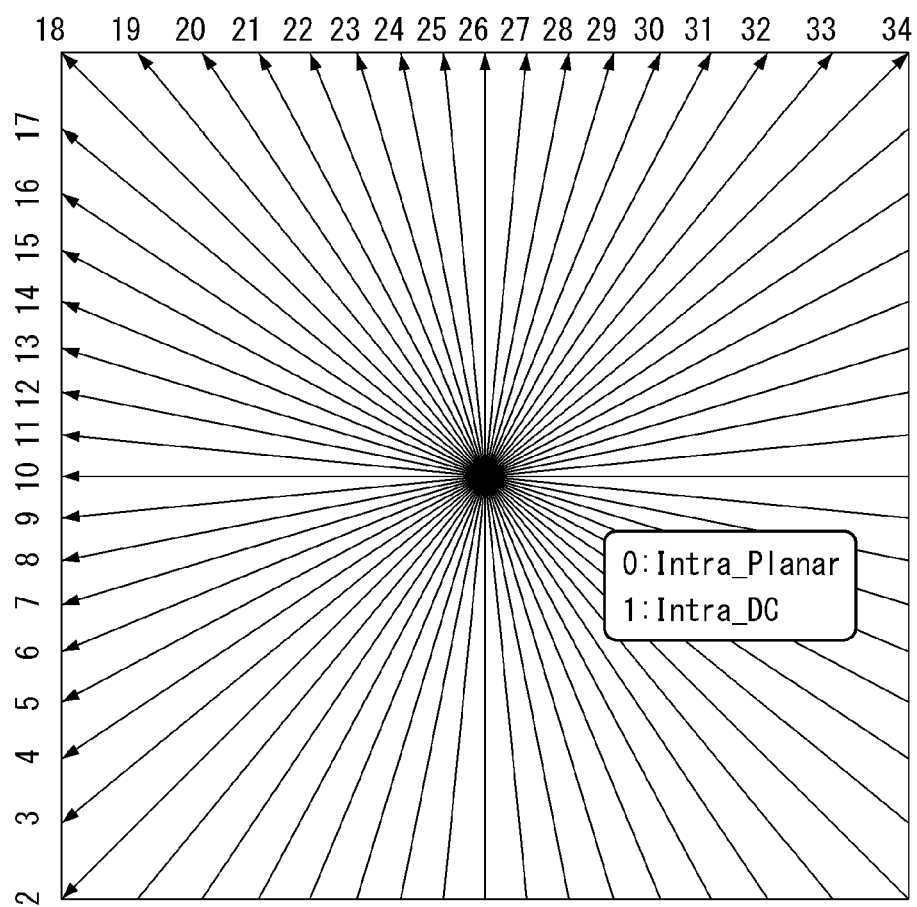

[FIG. 7]
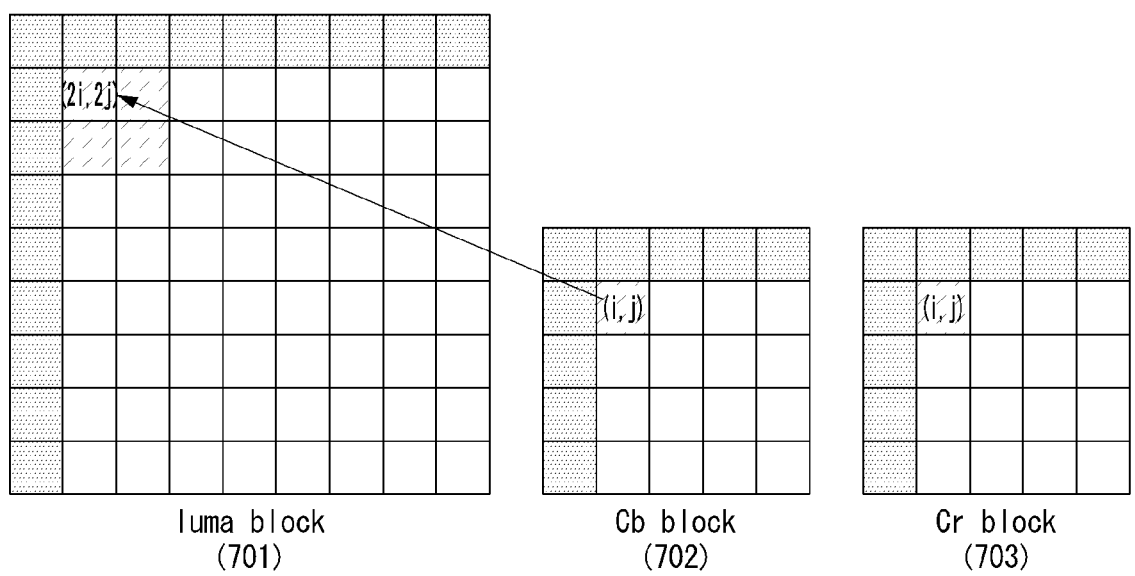

[FIG. 8]
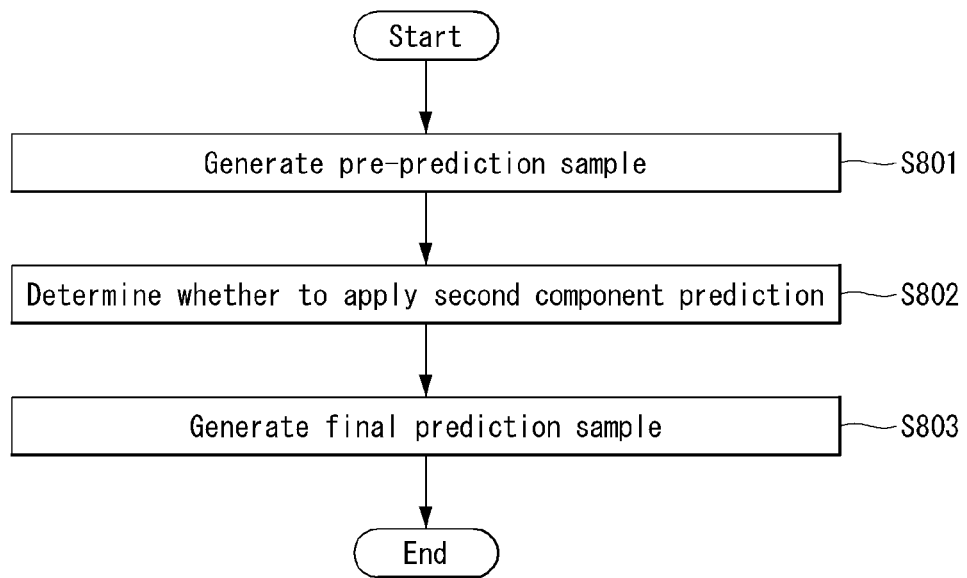

[FIG. 9]
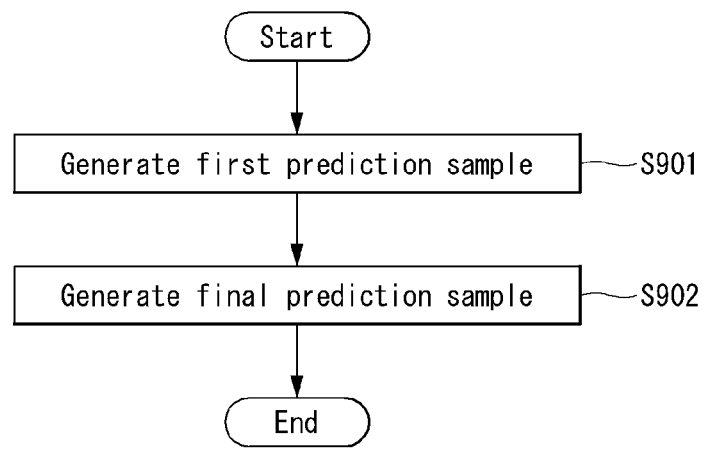

[FIG. 10]
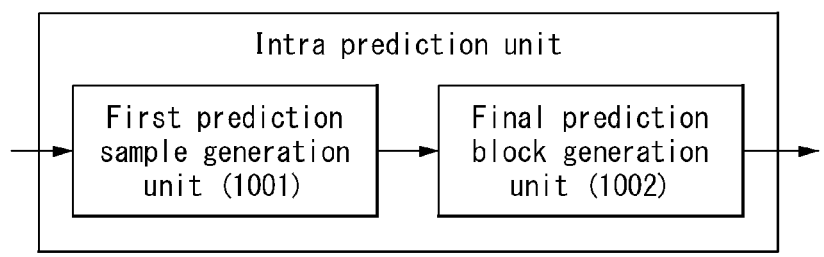

INTRA-PREDICTION MODE-BASED IMAGE PROCESSING METHOD AND APPARATUS THEREFOR

CROSS-REFERENCE TO RELATED APPLICATIONS

This application is the National Stage filing under 35 U.S.C. 371 of International Application No. PCT/KR2018/003781, filed on Mar. 30, 2018, which claims the benefit of U.S. Provisional Applications No. 62/522,710, filed on Jun. 21, 2017 and No. 62/575,511, filed on Oct. 22, 2017, the contents of which are all hereby incorporated by reference herein in their entirety.

TECHNICAL FIELD

The disclosure relates to a still image or moving image processing method and, more particularly, to a method of encoding/decoding a still image or moving image based on an intra-prediction mode and an apparatus supporting the same.

BACKGROUND ART

Compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression.

Next-generation video content is supposed to have the characteristics of high spatial resolution, high frame rate and high dimensionality of scene representation. In order to process such content, a drastic increase of a memory storage, memory access rate and processing power will be resulted.

Accordingly, it is required to design a coding tool for processing next-generation video content efficiently.

DISCLOSURE

Technical Problem

The disclosure proposes a method of enhancing efficiency of a cross-component linear model prediction in performing an intra prediction (or intra-frame prediction) on a chroma image.

Furthermore, the disclosure proposes a method of performing a cross-component linear model prediction using samples of a chroma component in addition to a luma component.

Furthermore, the disclosure proposes a method of performing a cross-component linear model prediction using a reconstructed sample between chroma components.

Technical objects to be achieved in the disclosure are not limited to the above-described technical objects, and other technical objects not described above may be evidently understood by a person having ordinary skill in the art to which the disclosure pertains from the following description.

Technical Solution

In an aspect of the disclosure, a method of processing an image based on an intra prediction mode may include generating a pre-prediction sample of a current chroma block by performing a first component prediction using a reconstructed sample of a luma block corresponding to the current chroma block, determining whether a second component prediction is applied to the current chroma block, and generating a final prediction sample of the current chroma block using a residual signal of another chroma block corresponding to the current chroma block and the pre-prediction sample when the second component prediction is applied.

Preferably, generating the pre-prediction sample may include determining a prediction mode used for the first component prediction among a component prediction mode using one linear model or a component prediction mode using a plurality of linear models.

Preferably, determining whether the second component prediction is applied may include determining that the second component prediction is applied when the current chroma block is a predetermined size or more.

Preferably, determining whether the second component prediction is applied may include calculating a correlation between a peripheral area of the current chroma block and a peripheral area of another chroma block. When the calculated correlation is a specific threshold or more, the second component prediction may be determined to be applied.

Preferably, the final prediction sample may be generated by adding, to the pre-prediction sample, a scaled value of a residual signal of the another chroma block.

Preferably, the final prediction sample may be generated by adding, to the pre-prediction sample, a scaled value of a residual signal of the another chroma block and an offset value.

Preferably, the offset value may be derived based on a difference between average values of a peripheral area of the current chroma block and a peripheral area of the another chroma block.

In another aspect of the disclosure, a method of processing an image based on an intra prediction mode may include generating a first prediction sample of a current chroma block by applying at least one of a component prediction using a reconstructed sample of a luma block corresponding to the current chroma block or a spatial prediction using a reference sample neighboring the current block and generating a final prediction sample of the current chroma block using a reconstructed sample of another chroma block corresponding to the current chroma block and the first prediction sample.

Preferably, generating the final prediction sample may include generating a second prediction sample by adding, to an offset value, a scaled value of the reconstructed sample of the another chroma block.

Preferably, the final prediction sample may be generated by adding the second prediction sample to the first prediction sample.

Preferably, the final prediction sample may be generating by weight-summing the first prediction sample and the second prediction sample.

Preferably, a weight applied to the first prediction sample or the second prediction sample may be preset or derived based on a correlation between a peripheral area of the current chroma block and a peripheral area of another chroma block.

Preferably, when the second prediction sample is greater than a first threshold and smaller than a second threshold, the final prediction sample may be generated by adding the second prediction sample to the first prediction sample.

Preferably, when the second prediction sample is not greater than the first threshold, the final prediction sample may be generated by adding the first threshold to the first prediction sample. When the second prediction sample is not smaller than the second threshold, the final prediction sample may be generated by adding the second threshold to the first prediction sample.

In another aspect of the disclosure, an apparatus for processing an image based on an intra prediction mode may include a first prediction sample generation unit configured to generate a first prediction sample of a current chroma block by applying at least one of a component prediction using a reconstructed sample of a luma block corresponding to the current chroma block or a spatial prediction using a reference sample neighboring the current block and a final prediction sample generation unit configured to generate a final prediction sample of the current chroma block using a reconstructed sample of another chroma block corresponding to the current chroma block and the first prediction sample.

Advantageous Effects

According to an embodiment of the disclosure, the accuracy of prediction for a chroma image can be increased and encoding performance can be enhanced by efficiently improving a cross-component linear model.

Furthermore, according to an embodiment of the disclosure, the accuracy of prediction can be increased by incorporating a correlation between chroma components in performing an intra prediction on a chroma image.

Furthermore, according to an embodiment of the disclosure, an inter-chroma component prediction can be performed more accurately by directly using a value of a reconstructed picture element for a prediction in performing an inter-chroma component prediction, and thus compression efficiency can be enhanced.

Effects which may be obtained in the disclosure are not limited to the aforementioned effects, and other technical effects not described above may be evidently understood by a person having ordinary skill in the art to which the disclosure pertains from the following description.

DESCRIPTION OF DRAWINGS

The accompanying drawings, which are included herein as a part of the description for help understanding the disclosure, provide embodiments of the disclosure, and describe the technical features of the disclosure with the description below.

FIG. 1 is an embodiment to which the disclosure is applied, and shows a schematic block diagram of an encoder in which the encoding of a still image or moving image signal is performed.

FIG. 2 is an embodiment to which the disclosure is applied, and shows a schematic block diagram of a decoder in which the encoding of a still image or moving image signal is performed.

FIG. 3 is a diagram for illustrating the split structure of a coding unit to which the disclosure may be applied.

FIG. 4 is a diagram for illustrating a prediction unit to which the disclosure may be applied.

FIG. 5 is an embodiment to which the disclosure is applied and is a diagram illustrating an intra-prediction method.

FIG. 6 illustrates prediction directions according to intra-prediction modes.

FIG. 7 is an embodiment to which the disclosure is applied and is a diagram for describing a method of generating a prediction block for a chroma block using a reconstructed sample of a luma block.

FIG. 8 is an embodiment to which the disclosure is applied and is a flowchart illustrating a method of performing an inter-chroma component prediction in a CCLM mode using a reconstructed sample of a luma component.

FIG. 9 is an embodiment to which the disclosure is applied and is a flowchart illustrating a method of performing an inter-chroma component prediction using a reconstructed sample of a previously encoded or decoded chroma component.

FIG. 10 is a diagram more specifically illustrating an intra prediction unit according to an embodiment of the disclosure.

MODE FOR INVENTION

Hereinafter, preferred embodiments of the disclosure will be described by reference to the accompanying drawings. The description that will be described below with the accompanying drawings is to describe exemplary embodiments of the disclosure, and is not intended to describe the only embodiment in which the disclosure may be implemented. The description below includes particular details in order to provide perfect understanding of the disclosure. However, it is understood that the disclosure may be embodied without the particular details to those skilled in the art.

In some cases, in order to prevent the technical concept of the disclosure from being unclear, structures or devices which are publicly known may be omitted, or may be depicted as a block diagram centering on the core functions of the structures or the devices.

Further, although general terms widely used currently are selected as the terms in the disclosure as much as possible, a term that is arbitrarily selected by the applicant is used in a specific case. Since the meaning of the term will be clearly described in the corresponding part of the description in such a case, it is understood that the disclosure will not be simply interpreted by the terms only used in the description of the disclosure, but the meaning of the terms should be figured out.

Specific terminologies used in the description below may be provided to help the understanding of the disclosure. Furthermore, the specific terminology may be modified into other forms within the scope of the technical concept of the disclosure. For example, a signal, data, a sample, a picture, a frame, a block, etc may be properly replaced and interpreted in each coding process.

Hereinafter, in this disclosure, a "block" or "unit" means a unit by which an encoding/decoding process, such as a prediction, a transform and/or quantization, is performed, and may be configured as a multi-dimension array of samples (or picture elements or pixels).

A "block" or "unit" may mean a multi-dimension array of samples for a luma component, and may mean a multi-dimension array of samples for a chroma component. Furthermore, a "block" or "unit" may generally refer to both a multi-dimension array of samples for a luma component and a multi-dimension array of samples for a chroma component.

For example, a "block" or "unit" may be interpreted as a meaning, including all of a coding block (CB) meaning an array of samples, that is, a target on which encoding/decoding is to be performed, a coding tree block (CTB) configured with a plurality of coding blocks, a prediction block (PB) (or prediction unit (PU)) meaning an array of samples to which the same prediction is applied, and a transform block (TB) (or transform unit (TU)) meaning an array of samples to which the same transform is applied.

Furthermore, unless described otherwise in this disclosure, a "block" or "unit" may be interpreted as a meaning, including a syntax structure used for a process of encoding/decoding an array of samples for a luma component and/or a chroma component. In this case, the syntax structure means a syntax element of 0 or more which is present in a bitstream as a specific sequence. The syntax element means an element of data represent within the bitstream.

For example, a "block" or "unit" may be interpreted as a meaning, including all of a coding block (CB) and a coding unit (CU) including a syntax structure used for the encoding of and the corresponding coding block (CB), a coding tree unit (CU) configured with a plurality of coding units, a prediction block (PB) and a prediction unit (PU) including a syntax structure used for the prediction of the corresponding prediction block (PB), and a transform block (TB) and a transform unit (TU) including a syntax structure used for the transform of the corresponding transform block (TB).

Furthermore, in this disclosure, a "block" or "unit" is not essentially limited to an array of samples (or picture elements or pixels) having a square or rectangular form, and may mean an array of samples (or picture elements or pixels) of a polygonal form having three vertexes or more. In this case, a "block" or "unit" may also be referred to as a polygon block or polygon unit.

FIG. 1 is an embodiment to which the disclosure is applied, and shows a schematic block diagram of an encoder in which the encoding of a still image or moving image signal is performed.

Referring to FIG. 1, an encoder 100 may include a picture split unit 110, a subtraction unit 115, a transform unit 120, a quantization unit 130, a dequantization (inverse quantization) unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., the inter-prediction unit 181 or intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate the transform coefficients by performing transform using a determined transform scheme depending on a prediction mode applied to the residual block and the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal that is outputted from the quantization unit 130 may be used for generating a prediction signal. For example, by applying dequantization and inverse transformation to the quantized signal through the dequantization unit 140 and the inverse transform unit 150, the residual signal may be reconstructed. By adding the reconstructed residual signal to the prediction signal that is outputted from the inter-prediction unit 181 or the intra-prediction unit 182, a reconstructed signal may be generated.

Meanwhile, during such a compression process, adjacent blocks are quantized by different quantization parameters from each other, and accordingly, an artifact in which block boundaries are shown may occur. Such a phenomenon is referred to blocking artifact, which is one of the important factors for evaluating image quality. In order to decrease such an artifact, a filtering process may be performed. Through such a filtering process, the blocking artifact is removed and the error for the current picture is decreased at the same time, thereby the image quality being improved.

The filtering unit 160 applies filtering to the reconstructed signal, and outputs it through a play-back device or transmits it to the decoded picture buffer 170. The filtered signal transmitted to the decoded picture buffer 170 may be used as a reference picture in the inter-prediction unit 181. As such, by using the filtered picture as a reference picture in an inter-picture prediction mode, the encoding rate as well as the image quality may be improved.

The decoded picture buffer 170 may store the filtered picture in order to use it as a reference picture in the inter-prediction unit 181.

The inter-prediction unit 181 performs a temporal prediction and/or a spatial prediction by referencing the reconstructed picture in order to remove a temporal redundancy and/or a spatial redundancy. In this case, since the reference picture used for performing a prediction is a transformed signal that goes through the quantization or the dequantization by a unit of block when being encoded/decoded previously, there may exist blocking artifact or ringing artifact.

Accordingly, in order to solve the performance degradation owing to the discontinuity of such a signal or the quantization, by applying a low pass filter to the inter-prediction unit 181, the signals between pixels may be interpolated by a unit of sub-pixel. Herein, the sub-pixel means a virtual pixel that is generated by applying an interpolation filter, and an integer pixel means an actual pixel that is existed in the reconstructed picture. As a method of interpolation, a linear interpolation, a bi-linear interpolation, a wiener filter, and the like may be applied.

The interpolation filter may be applied to the reconstructed picture, and may improve the accuracy of prediction. For example, the inter-prediction unit 181 may perform prediction by generating an interpolation pixel by applying the interpolation filter to the integer pixel, and by using the interpolated block that includes interpolated pixels as a prediction block.

The intra-prediction unit 182 predicts the current block by referring to the samples adjacent the block that is to be encoded currently. The intra-prediction unit 182 may perform the following procedure in order to perform the intra-prediction. First, the intra-prediction unit 182 may prepare a reference sample that is required for generating a prediction signal. Furthermore, the intra-prediction unit 182 may generate a prediction signal by using the reference sample prepared. After, the intra-prediction unit 182 may encode the prediction mode. In this case, the reference sample may be prepared through reference sample padding and/or reference sample filtering. Since the reference sample goes through the prediction and the reconstruction process, there may be a quantization error. Accordingly, in order to decrease such an error, the reference sample filtering process may be performed for each prediction mode that is used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 is an embodiment to which the disclosure is applied, and shows a schematic block diagram of a decoder in which the encoding of a still image or moving image signal is performed.

Referring to FIG. 2, a decoder 200 may include an entropy decoding unit 210, a dequantization unit 220, an inverse transform unit 230, an addition unit 235, a filtering unit 240, a decoded picture buffer (DPB) 250 and a prediction unit 260. Furthermore, the prediction unit 260 may include an inter-prediction unit 261 and an intra-prediction unit 262.

Furthermore, the reconstructed video signal outputted through the decoder 200 may be played through a play-back device.

The decoder 200 receives the signal (i.e., bit stream) outputted from the encoder 100 shown in FIG. 1, and the entropy decoding unit 210 performs an entropy decoding operation of the received signal.

The dequantization unit 220 acquires a transform coefficient from the entropy-decoded signal using quantization step size information.

The inverse transform unit 230 obtains a residual signal (or residual block) by inversely transforming transform coefficients using an inverse transform scheme.

The adder 235 adds the obtained residual signal (or residual block) to the prediction signal (or prediction block) output by the prediction unit 260 (i.e., inter-prediction unit 261 or intra-prediction unit 262), thereby generating a reconstructed signal (or reconstructed block).

The filtering unit 240 applies filtering to the reconstructed signal (or reconstructed block) and outputs it to a playback device or transmits it to the decoding picture buffer unit 250. The filtered signal transmitted to the decoding picture buffer unit 250 may be used as a reference picture in the inter-prediction unit 261.

In this disclosure, the embodiments described in the filtering unit 160, the inter-prediction unit 181 and the intra-prediction unit 182 of the encoder 100 may also be applied to the filtering unit 240, the inter-prediction unit 261 and the intra-prediction unit 262 of the decoder, respectively, in the same way.

In general, the block-based image compression method is used in a technique (e.g., HEVC) for compressing a still image or a moving image. A block-based image compression method is a method of processing a video by splitting the video into specific block units, and may decrease the capacity of memory and a computational load.

FIG. 3 is a diagram for illustrating the split structure of a coding unit that may be applied to the disclosure.

The encoder splits a single image (or picture) in a coding tree unit (CTU) of a rectangle form, and sequentially encodes a CTU one by one according to raster scan order.

In HEVC, the size of a CTU may be determined to be one of 64×64, 32×32 and 16×16. The encoder may select and use the size of CTU according to the resolution of an input video or the characteristics of an input video. A CTU includes a coding tree block (CTB) for a luma component and a CTB for two chroma components corresponding to the luma component.

One CTU may be split in a quad-tree structure. That is, one CTU may be split into four units, each having a half horizontal size and half vertical size while having a square form, thereby being capable of generating a coding unit (CU). The split of the quad-tree structure may be recursively performed. That is, a CU is hierarchically from one CTU in a quad-tree structure.

A CU means a basic unit for a processing process of an input video, for example, coding in which intra/inter prediction is performed. A CU includes a coding block (CB) for a luma component and a CB for two chroma components corresponding to the luma component. In HEVC, the size of a CU may be determined to be one of 64×64, 32×32, 16×16 and 8×8.

Referring to FIG. 3, a root node of a quad-tree is related to a CTU. The quad-tree is split until a leaf node is reached, and the leaf node corresponds to a CU.

This is described in more detail. A CTU corresponds to a root node and has the deepest depth (i.e., depth=0) value. A CTU may not be split depending on the characteristics of an input video. In this case, the CTU corresponds to a CU.

A CTU may be split in a quad-tree form. As a result, lower nodes of a depth 1 (depth=1) are generated. Furthermore, a node (i.e., a leaf node) no longer split from the lower node having the depth of 1 corresponds to a CU. For example, in FIG. 3(b), a CU(a), CU(b) and CU(j) corresponding to nodes a, b and j have been once split from a CTU, and have a depth of 1.

At least one of the nodes having the depth of 1 may be split in a quad-tree form again. As a result, lower nodes of a depth 2 (i.e., depth=2) are generated. Furthermore, a node (i.e., leaf node) no longer split from the lower node having the depth of 2 corresponds to a CU. For example, in FIG. 3(b), a CU(c), CU(h) and CU(i) corresponding to nodes c, h and i have been twice split from the CTU, and have a depth of 2.

Furthermore, at least one of the nodes having the depth of 2 may be split in a quad-tree form again. As a result, lower nodes having a depth of 3 (i.e., depth=3) are generated. Furthermore, a node (i.e., leaf node) no longer split from the lower node having the depth of 3 corresponds to a CU. For example, in FIG. 3(b), a CU(d), CU(e), CU(f) and CU(g) corresponding to nodes d, e, f and g have been split from the CTU three times, and have a depth of 3.

In the encoder, a maximum size or minimum size of a CU may be determined according to the characteristics of a video image (e.g., resolution) or by considering encoding rate. Furthermore, information about the size or information capable of deriving the size may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents the split count and/or degree of a CU, the depth information may include information about the size of a CU.

Since the LCU is split in a quad-tree form, the size of the SCU may be obtained using the size of the LCU and maximum depth information. Alternatively, the size of the LCU may be obtained using the size of the SCU and maximum depth information of a tree.

For a single CU, information (e.g., a split CU flag (split_cu_flag)) indicating whether the corresponding CU is split may be forwarded to the decoder. The split information is included in all of CUs except the SCU. For example, when the value of the flag indicating whether to split is '1', the corresponding CU is further split into four CUs, and when the value of the flag that represents whether to split is '0', the corresponding CU is not split any more, and the processing process for the corresponding CU may be performed.

As described above, the CU is a basic unit of the coding in which the intra-prediction or the inter-prediction is performed. The HEVC splits the CU in a prediction unit (PU) for coding an input video more effectively.

The PU is a basic unit for generating a prediction block, and even in a single CU, the prediction block may be generated in different way by a unit of a PU. However, the intra-prediction and the inter-prediction are not used together for the PUs that belong to a single CU, and the PUs that belong to a single CU are coded by the same prediction method (i.e., intra-prediction or the inter-prediction).

The PU is not split in the Quad-tree structure, but is split once in a single CU in a predetermined form. This will be described by reference to the drawing below.

FIG. 4 is a diagram for illustrating a prediction unit that may be applied to the disclosure.

A PU is differently split depending on whether the intra-prediction mode is used or the inter-prediction mode is used as the coding mode of the CU to which the PU belongs.

FIG. 4(a) illustrates a PU of the case where the intra-prediction mode is used, and FIG. 4(b) illustrates a PU of the case where the inter-prediction mode is used.

Referring to FIG. 4(a), assuming the case where the size of a single CU is 2N×2N (N=4, 8, 16 and 32), a single CU may be split into two types (i.e., 2N×2N or N×N).

In this case, in the case where a single CU is split into the PU of 2N×2N form, it means that only one PU is existed in a single CU.

In contrast, in the case where a single CU is split into the PU of N×N form, a single CU is split into four PUs, and different prediction blocks are generated for each PU unit. However, such a PU split may be performed only in the case where the size of a CB for the luma component of a CU is a minimum size (i.e., if a CU is the SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in intra-prediction, the PU split of N×N form may be performed only in the case where the size of a CB for the luma component of a CU is a minimum size (i.e., if a CU is the SCU).

Inter-prediction supports the PU split of a 2N×N form in the horizontal direction and an N×2N form in the vertical direction.

In addition, the inter-prediction supports the PU split in the form of nL×2N, nR×2N, 2N×nU and 2N×nD, which is asymmetric motion split (AMP). In this case, 'n' means ¼ value of 2N. However, the AMP may not be used in the case where a CU to which a PU belongs is a CU of minimum size.

In order to efficiently encode an input video in a single CTU, the optimal split structure of a coding unit (CU), prediction unit (PU) and transform unit (TU) may be determined based on a minimum rate-distortion value through the processing process as follows. For example, as for the optimal CU split process in a 64×64 CTU, the rate-distortion cost may be calculated through the split process from a CU of a 64×64 size to a CU of an 8×8 size. A detailed process is as follows.

1) The optimal split structure of a PU and TU that generates a minimum rate distortion value is determined by performing inter/intra-prediction, transformation/quantization, dequantization/inverse transformation and entropy encoding on a CU of a 64×64 size.

2) The optimal split structure of a PU and TU is determined by splitting a 64×64 CU into four CUs of a 32×32 size and generating a minimum rate distortion value for each 32×32 CU.

3) The optimal split structure of a PU and TU is determined by further splitting a 32×32 CU into four CUs of a 16×16 size and generating a minimum rate distortion value for each 16×16 CU.

4) The optimal split structure of a PU and TU is determined by further splitting a 16×16 CU into four CUs of an 8×8 size and generating a minimum rate distortion value for each 8×8 CU.

5) The optimal split structure of a CU in a 16×16 block is determined by comparing the rate-distortion value of the 16×16 CU obtained in the process of 3) with the addition of the rate-distortion value of the four 8×8 CUs obtained in the process of 4). This process is also performed on the remaining three 16×16 CUs in the same manner.

6) The optimal split structure of a CU in a 32×32 block is determined by comparing the rate-distortion value of the 32×32 CU obtained in the process of 2) with the addition of the rate-distortion value of the four 16×16 CUs obtained in the process of 5). This process is also performed on the remaining three 32×32 CUs in the same manner.

7) Lastly, the optimal split structure of a CU in a 64×64 block is determined by comparing the rate-distortion value of the 64×64 CU obtained in the process of 1) with the addition of the rate-distortion value of the four 32×32 CUs obtained in the process of 6).

In an intra-prediction mode, a prediction mode is selected in a PU unit, and prediction and reconstruction are performed on the selected prediction mode in an actual TU unit.

A TU means a basic unit by which actual prediction and reconstruction are performed. A TU includes a transform block (TB) for a luma component and two chroma components corresponding to the luma component.

In the example of FIG. 3, as if one CTU is split in a quad-tree structure to generate a CU, a TU is hierarchically split from one CU to be coded in a quad-tree structure.

A TU is split in the quad-tree structure, and a TU split from a CU may be split into smaller lower TUs. In HEVC, the size of a TU may be determined to be any one of 32×32, 16×16, 8×8 and 4×4.

Referring back to FIG. 3, it is assumed that the root node of the quad-tree is related to a CU. The quad-tree is split until a leaf node is reached, and the leaf node corresponds to a TU.

This is described in more detail. A CU corresponds to a root node and has the deepest depth (i.e., depth=0) value. A CU may not be split depending on the characteristics of an input video. In this case, the CU corresponds to a TU.

A CU may be split in a quad-tree form. As a result, lower nodes, that is, a depth 1 (depth=1), are generated. Furthermore, a node (i.e., leaf node) no longer split from the lower node having the depth of 1 corresponds to a TU. For example, in FIG. 3(b), a TU(a), TU(b) and TU(j) corresponding to the nodes a, b and j have been once split from a CU, and have a depth of 1.

At least one of the nodes having the depth of 1 may be split again in a quad-tree form. As a result, lower nodes, that is, a depth 2 (i.e., depth=2), are generated. Furthermore, a node (i.e., leaf node) no longer split from the lower node having the depth of 2 corresponds to a TU. For example, in FIG. 3(*b*), a TU(c), TU(h) and TU(i) corresponding to the nodes c, h and i have been split twice from the CU, and have a depth of 2.

Furthermore, at least one of the nodes having the depth of 2 may be split in a quad-tree form again. As a result, lower nodes having a depth of 3 (i.e., depth=3) are generated. Furthermore, a node (i.e., leaf node) no longer split from a lower node having the depth of 3 corresponds to a CU. For example, in FIG. 3(*b*), a TU(d), TU(e), TU(f), TU(g) corresponding to the nodes d, e, f and g have been split from the CU three times, and have the depth of 3.

A TU having a tree structure may be hierarchically split based on predetermined highest depth information (or highest level information). Furthermore, each split TU may have depth information. The depth information may also include information about the size of the TU because it indicates the number of times and/or degree that the TU has been split.

With respect to one TU, information (e.g., a split TU flag (split_transform_flag)) indicating whether a corresponding TU has been split may be transferred to the decoder. The split information is included in all TUs other than a TU of the least size. For example, if the value of the flag indicating whether a TU has been split is '1', the corresponding TU is split into four TUs. If the value of the flag '0', the corresponding TU is no longer split.

Prediction

In order to reconstruct a current processing unit on which decoding is performed, the decoded part of a current picture including the current processing unit or other pictures may be used.

A picture (slice) using only a current picture for reconstruction, that is, performing only intra-prediction, may be referred to as an intra-picture or I picture (slice). A picture (slice) using the greatest one motion vector and reference index in order to predict each unit may be referred to as a predictive picture or P picture (slice). A picture (slice) using a maximum of two motion vectors and reference indices in order to predict each unit may be referred to as a bi-predictive picture or B picture (slice).

Intra-prediction means a prediction method of deriving a current processing block from a data element (e.g., sample value, etc.) of the same decoded picture (or slice). That is, intra-prediction means a method of predicting a pixel value of the current processing block with reference to reconstructed regions within a current picture.

Inter-prediction means a prediction method of deriving a current processing block based on a data element (e.g., sample value or motion vector) of a picture other than a current picture. That is, inter-prediction means a method of predicting the pixel value of the current processing block with reference to reconstructed regions within another reconstructed picture other than a current picture.

Hereinafter, intra-prediction is described in more detail.

Intra-Prediction

FIG. 5 is an embodiment to which the disclosure is applied and is a diagram illustrating an intra-prediction method.

Referring to FIG. 5, the decoder derives an intra-prediction mode of a current processing block (S501).

In intra-prediction, there may be a prediction direction for the location of a reference sample used for prediction depending on a prediction mode. An intra-prediction mode having a prediction direction is referred to as intra-angular prediction mode "Intra_Angular prediction mode." In contrast, an intra-prediction mode not having a prediction direction includes an intra-planar (INTRA_PLANAR) prediction mode and an intra-DC (INTRA_DC) prediction mode.

Table 1 illustrates intra-prediction modes and associated names, and FIG. 6 illustrates prediction directions according to intra-prediction modes.

TABLE 1

| INTRA PREDICTION MODE | ASSOCIATED NAMES |
|---|---|
| 0 | INTRA_PLANAR |
| 1 | INTRA_DC |
| 2 . . . 34 | INTRA_ANGULAR2 . . . INTRA_ANGULAR34 |

In intra-prediction, prediction may be on a current processing block based on a derived prediction mode. A reference sample used for prediction and a detailed prediction method are different depending on a prediction mode. Accordingly, if a current block is encoded in an intra-prediction mode, the decoder derives the prediction mode of a current block in order to perform prediction.

The decoder checks whether neighboring samples of the current processing block may be used for prediction and configures reference samples to be used for prediction (S502).

In intra-prediction, neighboring samples of a current processing block mean a sample neighboring the left boundary of the current processing block of an nS×nS size, a total of 2×nS samples neighboring the left bottom of the current processing block, a sample neighboring the top boundary of the current processing block, a total of 2×nS samples neighboring the top right of the current processing block, and one sample neighboring the top left of the current processing block.

However, some of the neighboring samples of the current processing block have not yet been decoded or may not be available. In this case, the decoder may configure reference samples to be used for prediction by substituting unavailable samples with available samples.

The decoder may perform the filtering of the reference samples based on the intra-prediction mode (S503).

Whether the filtering of the reference samples will be performed may be determined based on the size of the current processing block. Furthermore, a method of filtering the reference samples may be determined by a filtering flag transferred by the encoder.

The decoder generates a prediction block for the current processing block based on the intra-prediction mode and the reference samples (S504). That is, the decoder generates the prediction block for the current processing block (i.e., generates a prediction sample) based on the intra-prediction mode derived in the intra-prediction mode derivation step S501 and the reference samples obtained through the reference sample configuration step S502 and the reference sample filtering step S503.

If the current processing block has been encoded in the INTRA_DC mode, in order to minimize the discontinuity of the boundary between processing blocks, at step S504, the left boundary sample of the prediction block (i.e., a sample within the prediction block neighboring the left boundary) and the top boundary sample (i.e., a sample within the prediction block neighboring the top boundary) may be filter.

Furthermore, at step S504, in the vertical mode and horizontal mode of the intra-angular prediction modes, as in the INTRA_DC mode, filtering may be applied to the left boundary sample or the top boundary sample.

This is described in more detail. If the current processing block has been encoded in the vertical mode or the horizontal mode, the value of a prediction sample may be derived based on a reference sample located in a prediction direction. In this case, a boundary sample that belongs to the left boundary sample or top boundary sample of the prediction block and that is not located in the prediction direction may neighbor a reference sample not used for prediction. That is, the distance from the reference sample not used for prediction may be much closer than the distance from the reference sample used for prediction.

Accordingly, the decoder may adaptively apply filtering on left boundary samples or top boundary samples depending on whether an intra-prediction direction is a vertical direction or a horizontal direction. That is, the decoder may apply filtering on the left boundary samples if the intra-prediction direction is the vertical direction, and may apply filtering on the top boundary samples if the intra-prediction direction is the horizontal direction.

As described in FIG. 1 and FIG. 2, the encoder/decoder generates a prediction block through an inter prediction (or inter-frame prediction) or an intra prediction (or intra-frame prediction), and generates a residual signal by subtracting the prediction block from the original block (or original image). In this case, the encoder transmits additional information indicating a prediction mode. The decoder generates a prediction block identically with the encoder using the prediction mode received from the encoder, and generates a reconstructed block by adding the prediction block and the residual signal.

In this case, in performing an intra prediction on a chroma image, the encoder/decoder may use a cross-component linear model (CCLM) mode as one of intra prediction modes. In this case, CCLM is a method of generating a chroma prediction sample using a reconstructed sample (or reconstructed signal) or residual sample (or residual signal) of a luma or another chroma component, and is a method based on a characteristic in that a correlation between a luma image and a chroma image or between chroma images is high.

That is, in general, if the correlation between a luma image and a chroma image is high, the encoder/decoder can increase the accuracy of a prediction compared to a chroma intra-prediction mode used in a convention image encoding technology by applying a CCLM mode.

FIG. 7 is an embodiment to which the disclosure is applied and is a diagram for describing a method of generating a prediction block for a chroma block using a reconstructed sample of a luma block.

Referring to FIG. 7, the encoder/decoder may generate a prediction block of a Cb chroma block 702 or Cr chroma block 703 using a reconstructed sample of a luma block 701. In a 4:2:0 color format, the luma block 701 may have a size twice the size of the chroma block 702, 703. Accordingly, the encoder/decoder may perform down-sampling on the luma block 701 before generating a prediction sample of the chroma block 702, 703.

In one embodiment, the encoder/decoder may generate the prediction block of the Cb chroma block 702 or the Cr chroma block 703 using Equation 1.

$$pred_C(i,j) = \alpha \cdot recon_L(2i, 2j) + \beta \quad \text{[Equation 1]}$$

In this case, pred_C(i,j) indicates a prediction sample of a Cb or Cr chroma component, and recon_L(2i,2j) indicates a reconstructed luma sample. Referring to Equation 1, in determining the prediction sample of the chroma component pred_C(i,j), the encoder/decoder may perform a CCLM prediction using the reconstructed sample recon_L(2i,2j) of the luma block 701 corresponding to the chroma block 702, 703 and a sample neighboring a corresponding luma block.

The encoder/decoder may use a $\alpha$ parameter indicating a scaling factor and a $\beta$ parameter indicating a compensation offset in Equation 1 in order to generate the prediction sample of the chroma block. For example, the $\alpha$ and $\beta$ parameters may be derived using Equation 2.

$$\alpha = \frac{M(t_L(i,j) - M(t_L)) \times M(t_C(i,j) - M(t_C))}{M(t_L(i,j) - M(t_L)) \times M(t_L(i,j) - M(t_L))}, \quad \text{[Equation 2]}$$

$$\beta = M(t_C) - \alpha M(t_L)$$

In this case, t_L indicates a peripheral template pixel of a luma block corresponding to a current chroma block. T_C indicates a peripheral template pixel of the current chroma block. Furthermore, M(A) means an average value of picture elements within an A peripheral template area.

Referring to Equation 2, the $\alpha$ parameter may be calculated using a cross-correlation between a peripheral template of the current chroma block and a peripheral template of a luma block. The $\beta$ parameter may be calculated using a difference between average values of the peripheral template of the current chroma block and the peripheral template of the luma block.

In the coding technology of a chroma image which is recently being discussed, the encoder/decoder performs a prediction in the remaining modes other than a CCLM mode if an intra prediction mode of a Cr chroma image is not the CCLM mode, and then performs CCLM between a Cb chroma image and the Cr chroma image. Specifically, the encoder/decoder may incorporate inter-chroma component prediction results into the existing prediction block as in Equation 3.

$$\begin{cases} pred_{Cr}(i,j) = \text{pre\_pred}_{Cr}(i,j) + \quad \text{if } \alpha < 0 \\ \quad \alpha \cdot residual_{Cb}(i,j) \\ pred_{Cr}(i,j) = \text{pre\_pred}_{Cr}(i,j) \end{cases} \quad \text{[Equation 3]}$$

Referring to Equation 3, pred_Cr indicates a prediction sample of the finally predicted Cr component. Furthermore, pre_pred_Cr indicates a prediction sample of a Cr component using the remaining prediction mode other than CCLM. residual_Cb indicates a residual sample of an encoded/decoded Cb chroma component. Furthermore, a is a scaling factor applied to a residual sample of the Cb chroma component, and may be calculated using a cross-correlation between the peripheral templates of Cb and Cr blocks identically with the methods described in Equations 1 and 2.

That is, the encoder/decoder may perform a prediction on the Cr component using the remaining prediction modes other than CCLM, and may then generate the final prediction sample using the residual signal of the Cb component based on the correlation between the peripheral templates of the Cb and Cr blocks.

In the disclosure, a case where a Cr chroma component among Cb and Cr chroma components is encoded/decoded after the Cb chroma component is basically described, but the disclosure is not limited thereto. That is, the encoder/decoder may perform a prediction on the other component using any one of Cb and Cr chroma components. For example, the encoder/decoder may perform a prediction on a Cb chroma component using a residual sample of a Cr chroma component as in Equation 3. In this case, in Equation 3, Cb and Cr may be exchanged.

In the disclosure, in describing a CCLM prediction method, for convenience of description, a mode other than the remaining mode other than a CCLM mode, that is, a mode in which an inter component prediction is performed, is referred to as an angular prediction mode, a chroma intra-prediction mode, a spatial prediction mode or a chroma spatial prediction mode. For example, if the remaining modes other than CCLM are referred to as an angular prediction mode, the angular prediction mode may include not only an angular mode in which the direction of a prediction is specified, but also a planar mode, a DC mode, and a DM mode, that is, modes applied to a conventional chroma image encoding technology.

As described above, in the coding technology of a chroma image which is recently discussed, Cb and Cr inter component predictions are used only in a mode other than a CCLM mode. However, with the continued improvement of the CCLM mode, a selection ratio of a CCLM mode is increased. Accordingly, there is a need to perform a Cb and Cr inter component prediction when the CCLM mode is applied. Accordingly, the disclosure proposes a method of efficiently performing a prediction between Cb and Cr components.

Embodiment 1

In an embodiment of the disclosure, the encoder/decoder may perform an inter-chroma component prediction in a cross-component linear model (CCLM) mode using a reconstructed sample of a luma component.

FIG. 8 is an embodiment to which the disclosure is applied and is a flowchart illustrating a method of performing an inter-chroma component prediction in a CCLM mode using a reconstructed sample of a luma component.

Referring to FIG. 8, the encoder/decoder generates a pre-prediction sample of a current chroma block by performing a first component prediction using a reconstructed sample of a luma block corresponding to the current chroma block (S801). That is, in this case, the first component prediction indicates a CCLM mode using the reconstructed sample of the luma block.

In this case, the first component prediction mode may be at least one of a linear model (LM) mode using one linear model, a multi-model linear model (MMLM) mode using a plurality of linear models or a multi-filter linear model (MFLM) mode using a plurality of down-sampling filters.

The encoder/decoder determines whether a second component prediction is applied to the current chroma block (S802). In this case, the second component prediction refers to a mode in which a Cb and Cr inter-chroma component prediction is performed.

Specifically, the encoder/decoder may determine that the second component prediction is applied if the current chroma block is a predetermined size or more.

For example, if a chroma block size is 16×16 or more, the encoder/decoder may perform the second component prediction in the CCLM mode.

Furthermore, the encoder/decoder may determine whether the second component prediction is applied based on a correlation between the peripheral area of the current chroma block and the peripheral area of another chroma block. For example, the encoder/decoder may calculate a correlation between the template area of the current chroma block and the template area of another chroma block, and may determine that the second component prediction is applied if the calculated correlation is a specific threshold or more.

For example, the encoder/decoder may calculate the correlation between the template area of the current chroma block and the template area of another chroma block using the same method as the method described in Equation 2. Furthermore, the encoder/decoder may apply the second component prediction if a calculated value is 0.5 or more, and may not apply the second component prediction if the calculated value is less than 0.5.

Furthermore, in one embodiment the encoder/decoder may apply the second component prediction only if a prediction mode applied to the current chroma block is a specific prediction mode. For example, the encoder/decoder may apply the second component prediction to the current chroma block if a current prediction mode is any one of a planar mode, a DC mode, an LM mode or an MMLM mode.

If the second component prediction is applied to the current chroma block, the encoder/decoder generates the final prediction sample of the current chroma block using the residual signal (or a residual sample) of another chroma block, corresponding to the current chroma block, and the pre-prediction sample generated at step S801 (S803).

In this case, the encoder/decoder may generate the final prediction sample using Equation 3.

In one embodiment, the encoder/decoder may generate the final prediction sample using Equation 4.

$$\text{pred}_{Cr}(i,j) = \text{pre\_pred}_{Cr}(i,j) + \alpha \cdot \text{residual}_{Cb}(i,j) \quad \text{[Equation 4]}$$

In this case, pred_Cr indicates a prediction sample of the finally predicted Cr component, and pre_pred_Cr indicates a pre-prediction sample predicted through a chroma intra-prediction mode of the Cr component. Furthermore, residual_Cb indicates a residual sample (or residual signal) of an already encoded/decoded Cb component. Furthermore, a indicates a scaling factor calculated using Equation 2. Referring to Equation 4, the encoder/decoder may always perform a Cb/Cr inter-component prediction regardless of an a value.

That is, as in Equation 3 or 4, the encoder/decoder may generate the final prediction sample by adding scaled values of the pre-prediction sample and the residual signal of another chroma block other than the current chroma block.

Furthermore, in one embodiment, the encoder/decoder may generate the final prediction sample using Equation 4 in a CCLM mode, and may generate the final prediction sample using Equation 3 in the remaining modes other than CCLM. Or, the encoder/decoder may generate the final prediction sample using Equation 3 in a CCLM mode, and may generate the final prediction sample using Equation 4 in the remaining modes other than CCLM.

Embodiment 2

In an embodiment of the disclosure, the encoder/decoder may apply an offset for a more elaborate prediction in performing an inter-chroma component prediction in a CCLM mode.

In general, a correlation between Cb and Cr chroma components is great, but the Cb and Cr chroma components may not have the same average value. According to an embodiment of the disclosure, as described above, if there is a difference between average values of Cb and Cr chroma components, the accuracy of prediction can be further increased by compensating for a difference between average values of chroma components.

In one embodiment, the encoder/decoder may generate the final prediction sample using Equation 5.

$$\begin{cases} pred_{Cr}(i, j) = \text{pre\_pred}_{Ce}(i, j) + \alpha \cdot residual_{Cb}(i, j) + \beta & \text{if} \\ pred_{Cr}(i, j) = \text{pre\_pred}_{Cr}(i, j) \end{cases}$$ [Equation 5]

In this case, pred_Cr indicates a prediction sample of the finally predicted Cr component, and pre_pred_Cr indicates a pre-prediction sample predicted through a chroma intra-prediction mode of the Cr component. Furthermore, residual_Cb indicates a residual sample of an already encoded/decoded Cb component. Furthermore, the α and β parameters may be calculated using Equation 2. That is, the β parameter may be derived based on a difference between average values of the peripheral area of the current chroma block and the peripheral area of another chroma block.

Referring to Equation 5, the encoder/decoder may perform a Cb and Cr inter-chroma component prediction using the α and β parameters like a CCLM method between a luma image and a chroma image. The encoder/decoder may perform a Cb and Cr inter-chroma component prediction only when the α parameter is a negative number.

In another embodiment, the encoder/decoder may generate the final prediction sample using Equation 6.

$$pred_{Cr}(i,j) = \text{pre\_pred}_{Cr}(i,j) + \alpha \cdot residual_{Cb}(i,j) + \beta$$ [Equation 6]

In this case, pred_Cr indicates a prediction sample of the finally predicted Cr component, and pre_pred_Cr indicates a pre-prediction sample predicted through a chroma intra-prediction mode of the Cr component. Furthermore, residual_Cb indicates a residual sample of an already encoded/decoded Cb component. Furthermore, the α and β parameters may be calculated using Equation 2. That is, the β parameter may be derived based on a difference between average values of the peripheral area of a current chroma block and the peripheral area of another chroma block.

Referring to Equation 6, the encoder/decoder may perform a Cb and Cr inter-chroma component prediction using the α and β parameters like a CCLM method between a luma image and a chroma image. In this case, unlike in Equation 5, the encoder/decoder may always perform a Cb and Cr inter-chroma component prediction regardless of a α parameter value.

Furthermore, in one embodiment, the encoder/decoder may adaptively select and apply the aforementioned equation as in the following example according to a chroma intra-prediction mode. For example, if an intra prediction mode applied to a current chroma block is an angular mode, the encoder/decoder may perform a Cb/Cr inter-component prediction using Equation 3 or 4. If an intra prediction mode applied to a current chroma block is a CCLM mode, the encoder/decoder may perform a Cb/Cr inter-component prediction using Equation 5 or 6.

Embodiment 3

In an embodiment of the disclosure, the encoder/decoder may generate a prediction sample of a current chroma block using a reconstructed sample of another chroma block.

In this case, another chroma block indicate4s a previously encoded/decoded chroma block in an encoding/decoding sequence.

FIG. 9 is an embodiment to which the disclosure is applied and is a flowchart illustrating a method of performing an inter-chroma component prediction using a reconstructed sample of a previously encoded or decoded chroma component.

Referring to FIG. 9, the encoder/decoder generates the first prediction sample of a current chroma block by applying at least one of a component prediction (or CCLM prediction) using a reconstructed sample of a luma block corresponding to the current chroma block or a spatial prediction using a reference sample neighboring the current block (S901).

The encoder/decoder generates the final prediction sample of the current chroma block using a reconstructed sample of another chroma block corresponding to the current chroma block and the first prediction sample (S902).

In this case, the encoder/decoder may generate the second prediction sample by adding an offset value to a scaled value of a reconstructed sample of another chroma block other than the current chroma block. Furthermore, the encoder/decoder may generate the final prediction sample by adding the second prediction sample to the first prediction sample.

Furthermore, in one embodiment, the encoder/decoder may generate the final prediction sample by weight-summing the first prediction sample and the second prediction sample. In this case, Equation 7 may be used.

$$pred_{Cr}(i,j) = weight_{Cr} \times \text{pre\_pred}_{Cr}(i,j) + weight_{Cb} \times (\alpha \cdot recon_{Cb}(i,j) + \beta)$$ [Equation 7]

In this case, recon_Cb indicates a reconstructed sample of a Cb chroma block. Furthermore, weight_Cr indicates a weight (hereinafter referred to as a "first weight") applied to a first prediction sample, and weight_Cb indicates a weight (hereinafter referred to as a "second weight") applied to a second prediction sample. Furthermore, the α and β parameters may be calculated using Equation 2. Referring to Equation 7, the encoder/decoder may use a reconstructed signal not the residual signal of a Cb chroma block for an inter component prediction.

The encoder/decoder may perform a Cb and Cr inter-chroma component prediction using α and β parameters like a CCLM method between a luma image and a chroma image.

Unlike in the methods described in Embodiments 1 and 2 in which the residual signal of a Cb chroma block is used, according to a method proposed in the present embodiment, a more elaborate Cb/Cr inter-component prediction can be performed because a value of a picture element of a reconstructed Cr chroma block is directly used for a prediction. Furthermore, the sum of a first weight and second weight may always maintain 1.

In one embodiment, a first weight applied to a first prediction sample and a second weight applied to a second prediction sample may be preset. Furthermore, the probability that a first prediction sample generated according to a prediction mode determined in the encoder through rate-distortion optimization will have higher accuracy of a prediction than a second prediction sample is high. Accordingly, the first weight may be set as a value greater than the second weight. For example, the first weight may be set to ¾, and the second weight may be set to ¼. Or for example, the first weight may be set to ⅞, and the second weight may be set to ⅛.

In another embodiment, a first weight applied to a first prediction sample and a second weight applied to a second prediction sample may be derived based on a correlation between the peripheral area of a current chroma block and the peripheral area of another chroma block. For example, when a α parameter value is smaller than 0, the first weight may be set to ⅞, and the second weight may be set to ⅛. Furthermore, when a α parameter value is greater than or equal to 0, the first weight may be set to ¾, and the second weight may be set to ¼. In this case, the α parameter may be calculated using Equation 2.

As the α parameter value increases, a correlation between Cb/Cr components is high. Accordingly, the accuracy of a picture element predicted through a Cb/Cr inter-component prediction may be considered to be high. Accordingly, a chroma prediction sample can be generated more accurately by assigning a relatively great weight to a second prediction sample when a α parameter value is great and assigning a relatively small weight to the second prediction sample when the α parameter value is small.

Furthermore, in one embodiment, the encoder/decoder may adaptively select and apply the aforementioned equation as in the following example according to a chroma intra-prediction mode. For example, the encoder/decoder may perform an inter-chroma component prediction using Equation 7 if an intra prediction mode applied to a current chroma block is any one of a planar mode, a DC mode, an angular mode, a CCLM mode or an MMLM mode, and may perform an inter-chroma component prediction using Equation 3 if an intra prediction mode applied to a current chroma block is an MFLM mode.

Embodiment 4

In an embodiment of the disclosure, the encoder/decoder may restrict the range of a weight used to generate the final prediction sample in performing an inter-chroma component prediction. In this case, the weight generally refers to a value added to a pre-prediction sample in order to interpolate the pre-prediction sample (i.e., generate the final prediction sample).

For example, the encoder/decoder may restrict the range of a weight as in Equation 8.

$pred_{Cr}(i,j) = pre\_pred_{Cr}(i,j) + weight$ $weight = Clip3(threshold1, threshold2, \alpha \cdot residual_{Cb}(i,j) + \beta)$     [Equation 8]

Referring to Equation 8, a case where the final prediction sample is generated using the method described in Embodiment 2 is assumed. In this case, the Clip3 function is a function of controlling the range of an output value. The encoder/decoder may restrict a weight (i.e., a-residual_Cb (i,j)+β) value) between a first threshold and a second threshold through the Clip3 function. Furthermore, the α and β parameters may be calculated using Equation 2.

That is, when a weight value is greater than the first threshold and smaller than the second threshold, the final prediction sample may be generated by adding the weight value to a pre-prediction sample (or first prediction sample). When the weight value is not greater than the first threshold, the final prediction sample may be generated by adding the first threshold to the pre-prediction sample. When the weight value is not smaller than the second threshold, the final prediction sample may be generated by adding the second threshold to the pre-prediction sample.

The weight range restriction in the example of Equation 8 may be applied to all the Equations 1 to 7 described in Embodiments 1 to 3.

In this case, the threshold may be set or derived using various and several methods as in the following example. For example, the threshold used for the weight range restriction may be adaptively determined based on a pre-prediction sample value.

For example, the first threshold may be determined as −(0.1*pre-prediction sample value), and the second threshold may be determined as (0.1*pre-prediction sample value).

Or, for example, an optimal first threshold and second threshold may be derived through experiments, and the encoder and the decoder may set a fixed value to the first threshold and second threshold.

Or, for example, the encoder/decoder may adaptively set the threshold based on a prediction mode applied to a current chroma block. For example, the encoder/decoder may set the threshold based on a prediction mode as in the example of Table 2.

TABLE 2

| Prediction mode | First threshold | Second threshold |
| --- | --- | --- |
| PLANAR | −(0.1 * pre_pred$_{Cr}$) | −(0.1 * pre_pred$_{Cr}$) |
| VERTICAL | 0 | −(0.1 * pre_pred$_{Cr}$) |
| HORIZONTAL | −(0.1 * pre_pred$_{Cr}$) | 0 |
| LM | −(0.05 * pre_pred$_{Cr}$) | −(0.05 * pre_pred$_{Cr}$) |

In Table 2, the prediction mode indicates a prediction mode of a current chroma block (i.e., Cr chroma block), and pre_pred_Cr indicates a pre-prediction sample. Referring to Table 2, the encoder/decoder may determine the first threshold and the second threshold using a sample value of a pre-prediction sample based on a prediction mode of a current chroma block.

In one embodiment, the encoder/decoder may adaptively select the weight range restriction as in the following example based on a chroma intra-prediction mode.

1. The encoder/decoder may apply the weight range restriction to only CCLM modes.
2. The encoder/decoder may apply the weight range restriction to only angular prediction modes.
3. The encoder/decoder may always apply the weight range restriction when performing an inter-chroma component prediction.
4. The encoder/decoder may adaptively apply the weight range restriction on a specific prediction mode. For example, the encoder/decoder may apply the weight range restriction to only a mode other than a planar mode, a DC mode, an LM mode and an MMLM mode.

Embodiment 5

In an embodiment of the disclosure, the encoder/decoder may perform an inter-chroma component prediction using a plurality of linear models.

Specifically, the encoder/decoder may perform a Cb/Cr inter-chroma component prediction using two linear models and different a parameters. In this case, the encoder/decoder may generate a prediction block of a Cr chroma block using Equation 9.

$$\begin{cases} pred_{Cr}(i,j) = pre\_pred_{Cr}(i,j) + & \text{if } residual_{Cb}(i,j) < \\ \alpha_1 \cdot residual_{Cb}(i,j) & \text{Threshold} \\ pred_{Cr}(i,j) = pre\_pred_{Cr}(i,j) + & \text{if } residual_{Cb}(i,j) \geq \\ \alpha_2 \cdot residual_{Cb}(i,j) & \text{Threshold} \end{cases}$$ [Equation 9]

Referring to Equation 9, the encoder/decoder may obtain a threshold for classifying Cb chroma samples into two groups based on a sample value of a peripheral template of a luma block corresponding to a chroma block. Thereafter, the encoder/decoder may classify luma samples into two groups based on the obtained threshold, and may calculate two types of a parameter values (i.e., α_1 and α_2) for each group using only a corresponding group picture element. That is, the encoder/decoder may classify values of the Cb chroma samples, corresponding to a Cr chroma block, based on the obtained threshold, and may perform an inter component prediction using a α value determined for each group.

α_1, α_2 may be calculated through Equation 2. Furthermore, the method proposed in the present embodiment may be identically applied to Embodiments 1 to 4.

FIG. 10 is a diagram more specifically illustrating an intra prediction unit according to an embodiment of the disclosure.

In FIG. 10, the intra prediction unit 182 (refer to FIG. 1), 262 (refer to FIG. 2) has been illustrated as a single block, for convenience of description, but the intra prediction unit 182, 262 may be implemented as an element included in the encoder and/or the decoder.

Referring to FIG. 10, the intra prediction unit 182, 262 implements the functions, processes and/or methods proposed in FIGS. 5 to 17. Specifically, the intra prediction unit 182, 262 may be configured with a first prediction sample generation unit 1001 and a final prediction block generation unit 1002.

The first prediction sample generation unit 1001 generates a first prediction sample of a current chroma block by applying at least one of a component prediction (or CCLM prediction) using a reconstructed sample of a luma block corresponding to the current chroma block or a spatial prediction using a reference sample neighboring the current block.

The final prediction block generation unit 1002 generates the final prediction sample of the current chroma block using a reconstructed sample of another chroma block corresponding to a current chroma block and the first prediction sample.

In this case, the final prediction block generation unit 1002 may generate a second prediction sample by adding an offset value to a scaled value of the reconstructed sample of another chroma block other than the current chroma block. Furthermore, the final prediction block generation unit 1002 may generate the final prediction sample by adding the second prediction sample to the first prediction sample.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative from all aspects, but should be construed as being illustrative. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method of processing an image based on an intra prediction mode, the method comprising:
generating a pre-prediction sample of a current chroma block by performing a first component prediction using a reconstructed sample of a luma block corresponding to the current chroma block;
determining whether a second component prediction is applied to the current chroma block; and
generating a final prediction sample of the current chroma block using a residual signal of another chroma block corresponding to the current chroma block and the pre-prediction sample when the second component prediction is applied.

2. The method of claim 1,
wherein generating the pre-prediction sample comprises determining a prediction mode used for the first component prediction among a component prediction mode using one linear model or a component prediction mode using a plurality of linear models.

3. The method of claim 1,
wherein determining whether the second component prediction is applied comprises determining that the second component prediction is applied when the current chroma block is a predetermined size or more.

4. The method of claim 1,
wherein determining whether the second component prediction is applied comprises calculating a correlation between a peripheral area of the current chroma block and a peripheral area of another chroma block, and
wherein when the calculated correlation is a specific threshold or more, the second component prediction is determined to be applied.

5. The method of claim 1,
wherein the final prediction sample is generated by adding, to the pre-prediction sample, a scaled value of a residual signal of the another chroma block.

6. The method of claim 1,
wherein the final prediction sample is generated by adding, to the pre-prediction sample, a scaled value of a residual signal of the another chroma block and an offset value.

7. The method of claim 6,
wherein the offset value is derived based on a difference between average values of a peripheral area of the current chroma block and a peripheral area of the another chroma block.

8. A method of processing an image based on an intra prediction mode, the method comprising:
generating a first prediction sample of a current chroma block by applying at least one of a component prediction using a reconstructed sample of a luma block corresponding to the current chroma block or a spatial prediction using a reference sample neighboring the current block; and
generating a final prediction sample of the current chroma block using a reconstructed sample of another chroma block corresponding to the current chroma block and the first prediction sample.

9. The method of claim 8,
wherein generating the final prediction sample comprises generating a second prediction sample by adding, to an offset value, a scaled value of the reconstructed sample of the another chroma block.

10. The method of claim 9,
wherein the final prediction sample is generated by adding the second prediction sample to the first prediction sample.

11. The method of claim 9,
wherein the final prediction sample is generating by weight-summing the first prediction sample and the second prediction sample.

12. The method of claim 11,
wherein a weight applied to the first prediction sample or the second prediction sample is preset or derived based on a correlation between a peripheral area of the current chroma block and a peripheral area of another chroma block.

13. The method of claim 9,
wherein when the second prediction sample is greater than a first threshold and smaller than a second threshold, the final prediction sample is generated by adding the second prediction sample to the first prediction sample.

14. The method of claim 13,
wherein when the second prediction sample is not greater than the first threshold, the final prediction sample is generated by adding the first threshold to the first prediction sample, and
wherein when the second prediction sample is not smaller than the second threshold, the final prediction sample is generated by adding the second threshold to the first prediction sample.

15. An apparatus for processing an image based on an intra prediction mode, the apparatus comprising:
a first prediction sample generation unit configured to generate a first prediction sample of a current chroma block by applying at least one of a component prediction using a reconstructed sample of a luma block corresponding to the current chroma block or a spatial prediction using a reference sample neighboring the current block; and
a final prediction sample generation unit configured to generate a final prediction sample of the current chroma block using a reconstructed sample of another chroma block corresponding to the current chroma block and the first prediction sample.

* * * * *